United States Patent [19]

Henzi

[11] Patent Number: 4,728,338

[45] Date of Patent: Mar. 1, 1988

[54] MIXTURES OF AT LEAST ONE MONOAZO COMPOUND HAVING A 2-CYANO 4,6-DINITROPHENYL DIAZO COMPONENT RADICAL AND AT LEAST ONE MONOAZO COMPOUND HAVING A 2-CYANO-6-HALO-4-NITROPHENYL DIAZO COMPONENT RADICAL AND THEIR USE

[75] Inventor: Beat Henzi, Basel, Switzerland

[73] Assignee: Sandoz Ltd., Basel, Switzerland

[21] Appl. No.: 889,995

[22] Filed: Jul. 28, 1986

[30] Foreign Application Priority Data

Aug. 2, 1985 [DE] Fed. Rep. of Germany ....... 3527795

[51] Int. Cl.$^4$ .................... C09B 29/08; C09B 67/22; D06P 1/18; D06P 3/54
[52] U.S. Cl. .......................................... 8/639; 8/696; 8/922
[58] Field of Search ............................... 8/639

[56] References Cited

U.S. PATENT DOCUMENTS

| 3,342,804 | 9/1967 | Mueller | 8/696 |
| 3,398,135 | 8/1968 | Mueller | 8/693 |
| 3,954,395 | 5/1976 | Leverenz | 8/639 |
| 4,405,330 | 9/1983 | Bergmann et al. | 8/639 |
| 4,432,770 | 2/1984 | Hasler et al. | 8/639 |

FOREIGN PATENT DOCUMENTS

| 57-139578 | 8/1982 | Japan . |
| 1080480 | 8/1967 | United Kingdom . |
| 1582743 | 1/1981 | United Kingdom . |

Primary Examiner—A. Lionel Clingman

Attorney, Agent, or Firm—Gerald D. Sharkin; Richard E. Vila; Melvyn M. Kassenoff

[57] ABSTRACT

Compositions comprising
(a) 30–70% by weight of one or more compounds of the formula

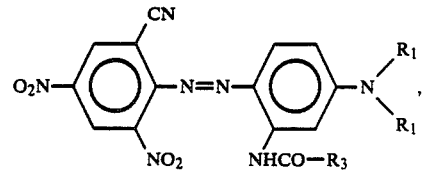

wherein each $R_1$ is independently $C_{2-4}$alkyl, and $R_3$ is methyl or ethyl; and
(b) 30–70% by weight of one or more compounds of the formula

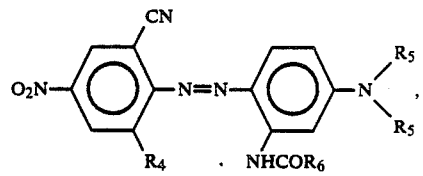

wherein $R_4$ is chloro, bromo or iodo each $R_5$ is independently $C_{2-4}$alkyl, and $R_6$ is methyl or ethyl are useful for dyeing substrates comprising a synthetic or semi-synthetic hydrophobic organic material, e.g., polyester, by, for example, the rapid dyeing process.

20 Claims, No Drawings

MIXTURES OF AT LEAST ONE MONOAZO COMPOUND HAVING A 2-CYANO 4,6-DINITROPHENYL DIAZO COMPONENT RADICAL AND AT LEAST ONE MONOAZO COMPOUND HAVING A 2-CYANO-6-HALO-4-NITROPHENYL DIAZO COMPONENT RADICAL AND THEIR USE

The invention relates to novel disperse dye compositions for dyeing, padding or printing fully synthetic or semi-synthetic hydrophobic organic material.

According to the invention there is provided compositions comprising (a) 30 to 70% by weight of one or more compounds of formula I

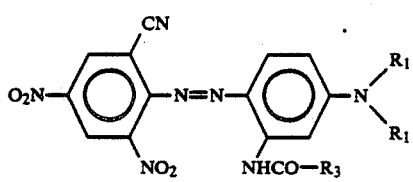

in which each $R_1$ independently, is $C_{2-4}$alkyl; and $R_3$ is methyl or ethyl (hereinafter referred to as component (a));

(b) 70 to 30% by weight one or more compounds of formula II

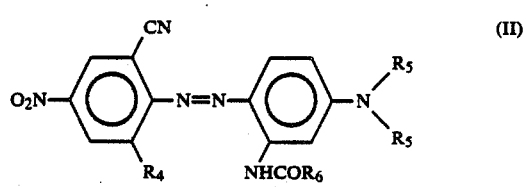

in which $R_4$ is chloro, bromo or iodo; each $R_5$ independently is $C_{2-4}$alkyl; and $R_6$ is methyl or ethyl (hereinafter referred to as component (b)); the percentages given are based on the dry weight of components (a) and (b).

In this specification any substituent capable of being linear or branched is linear or branched. However, such a substituent is preferably linear. For the avoidance of doubt, where a symbol appears more than once in a formula, its significances are independent of one another, unless indicated to the contrary. In this specification any % given is by weight.

Preferably $R_1$ is $R_1'$ where $R_1'$ is ethyl or propyl.
Preferably $R_3$ is $R_3'$ where $R_3'$ is methyl.
Preferably $R_4$ is $R_4'$ where $R_4'$ is bromo.
Preferably $R_5$ is $R_5'$ where $R_5'$ is ethyl or propyl.
Preferably $R_6$ is $R_6'$ where $R_6'$ is ethyl.

Preferably component (b) (based on dry weight of component (b)) comprises (i) 20 to 30% of a compound of formula III

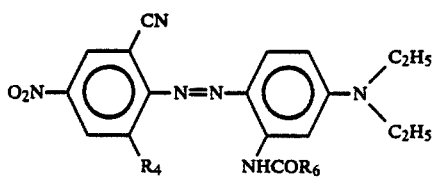

(ii) 20 to 30% of a compound of formula IV

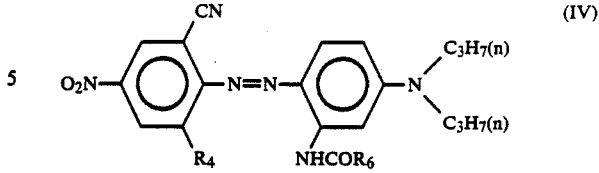

(iii) 40 to 60% of a compound of formula V

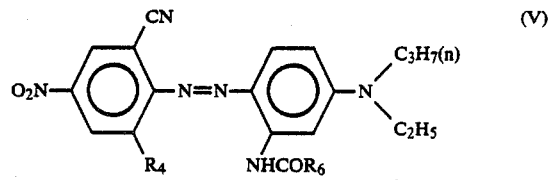

in which $R_4$ and $R_6$ are as defined above.

Component (b) however may comprise 40 to 60% of a compound of formula III and 40 to 60% of a compound of formula IV.

Component (a) may also comprise more than one compound. When this is the case this may comprise (based on dry weight of component (a))

(i) 20 to 30% of a compound of formula VII

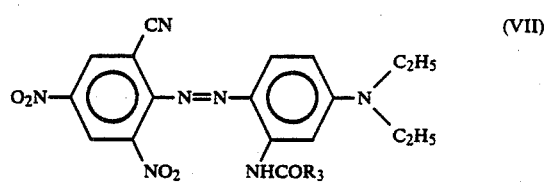

(ii) 20 to 30% of a compound of formula VIII

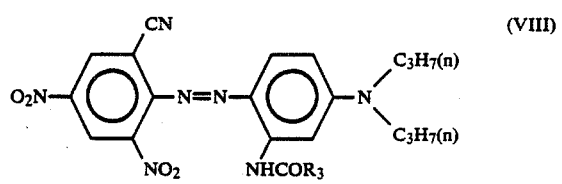

(iii) 40 to 60% of a compound of formula IX

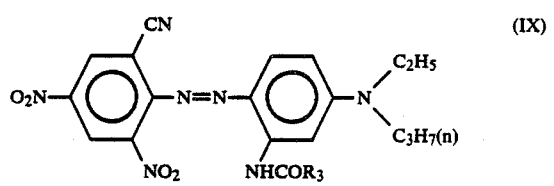

in which $R_3$ is as defined above. Component (a) may preferably comprise 40 to 60% of a compound of formula VII and 40 to 60% of a compound of formula VIII.

Preferably when component (a) is a single compound it is one of formula VII defined above.

Compositions according to the invention may also include further dyestuffs such as 1 to 10% by dry weight of the total composition of one or more compounds of formula VI

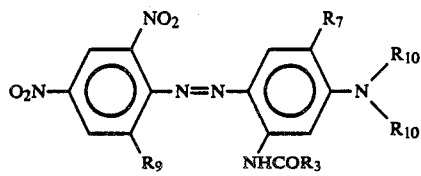

in which $R_7$ is $-O-C_{1-4}$alkyl $R_9$ is chloro, bromo, iodo or cyano and each $R_{10}$ independently is hydrogen, cyclohexyl or $C_{1-6}$alkyl, provided that not more than one $R_{10}$ is cyclohexyl and not more than one $R_{10}$ is hydrogen.

The individual compounds of formulae I, II and VI are known.

Compositions according to the invention can simply be prepared by mixing appropriate amounts of the individual components as granulate, powder or as a presscake. The presscakes, when used, are usually milled or suspended in water and dried by atomisation.

Compositions according to the invention are preferably used in the form of dyeing preparations. Such preparations are well known and contain one or more dispersing agents and optionally other additives commonly used in the art.

Compositions according to the invention are particularly useful for rapid dyeing.

By rapid dyeing is meant a process for dyeing a substrate comprising placing the substrate in a dyebath containing a composition according to the invention at 50° to 60° C. and raising the temperature of the dyebath to 120° to 130° C. over a period of up to 30 minutes, and then treating the substrate at this temperature for a period of up to 30 minutes, usually 20 to 30 minutes. Compositions according to the invention exhaust well and dyeings result that are level and have good fastness properties; in particular for rapid dyeing carried out at at least 120° C. (more preferably at least 125° C.) the build-up of the dyestuff mixture is hardly temperature dependent.

Also within the scope of this invention are substrates to which a compositio according to this invention has been applied.

The invention will now be illustrated by the following Examples in which all parts and percentages are by weight and all temperatures are in °C. unless indicated to the contrary.

EXAMPLE 1

(a) A dyestuff mixture comprising a 1:1 mixture of component (A), the compound of formula 1a

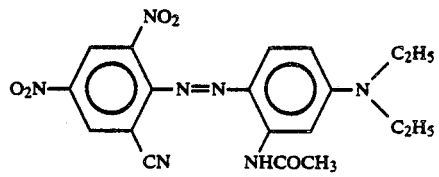

and component (B), a mixture comprising (i) (approximately) 25% of the compound of formula 1b

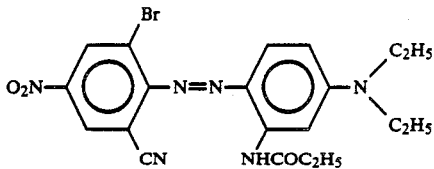

(ii) (approximately) 25% of the compound of formula 1c

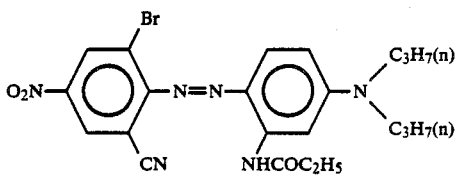

(iii) (approximately) 50% of the compound of formula 1d

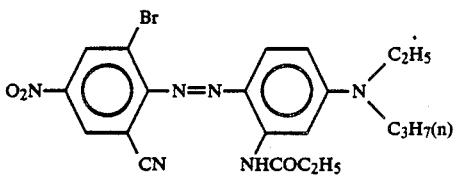

λmax for the mixture of component (A) and (B) is 600 nm (an average value); and can be prepared as follows.

To form the compounds of component (B) above, the corresponding coupling components are formed by alkylating 3-propionylaminoaniline with a 1:1 mixture of ethylbromide and n-propylbromide in water in the presence of sodium carbonate at 100° to 120° C.

Coupling components that are so formed are coupled to the diazotised 2-cyano-4-nitro-6-bromoaniline. The resulting dyestuff mixture is then washed with methanol/water and optionally further purified (recrystalisation or thin layer chromatography). In this fashion the compounds of component (B) are formed.

The compound of formula 1a (component A) is formed by coupling 3-acetylamino-N,N-diethylaniline with diazotised 2,4-dinitro-6-bromoaniline by known methods (e.g. as described in U.S. Pat. Nos. 4,105,655 and 4,237,048 in pyridine as solvent at 75° to 85° with Cu(I)CN).

(b) 18 Parts of the 1:1 mixture of components (A) and (B) described above in the form of a wet presscake (phototiter value of 93%) are wet milled with 80.6 parts of a commercially available dispersing agent (a lignin sulphonate) by known methods. The mixture is then atomised to a powder having about 18% pure components (A) and (B).

40 Parts of this dyestuff preparation are placed in a dyebath containing 2000 parts of demineralised water and 40 parts of ammonium sulphate, at 70°. The pH of the resulting dyebath is raised to 5 by the addition of sufficient 85% formic acid. To the dyebath, 100 parts of precleaned polyester fabric are added and the dyebath is closed, heated over 20 minutes to 130° and dyed for a further 20 minutes at this temperature. After cooling, the polyester fabric is taken out of the dyebath, washed, saponified and reductive cleared with sodium hydrosulphite (by known methods).

The resulting dyeings are level deep blue dyeings having good wash, light and sublimation fastness and good fastness to rubbing.

Compared to the individual compounds of components (A) and (B), the compositions of Example 1 show a better build-up over a short period of dyeing (e.g. 20 minutes) and improvement of build-up can be noticed even when the dyeings made at 120° (or more especially at 125° or are compared with 130° dyeings of the individual compounds.

EXAMPLE 2

Example 1b is repeated except that, in place of 18 parts of component (A) and component (B) in Example 1b, 4.8 parts of a 1:1 mixture of component (B) of Example 1b and component (C), in which component (C) is a 1:1 mixture of the compound of formula 2a

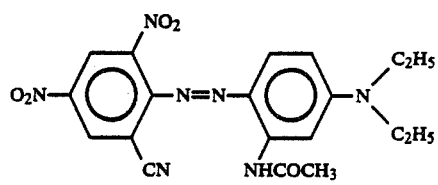

and the compound of formula 2b

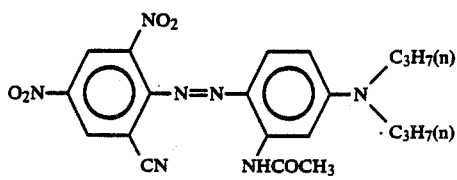

[max=612 nm are used. The resulting dyeings are similar to those of Example 1.

EXAMPLE 3

The method of Example 1b is repeated using 4.7 parts of a 1:1 mixture of components (B) and (D) instead of the 18 parts of components (A) and (B); Component (D) being a mixture comprising 25% of the compound of formula 3a

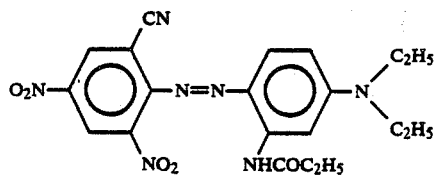

25% of the compound of formula 3b

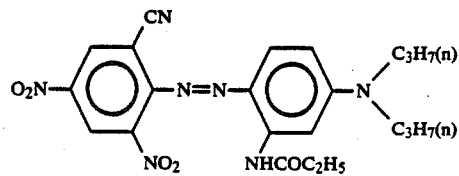

and 50% of the compound of formula 3c

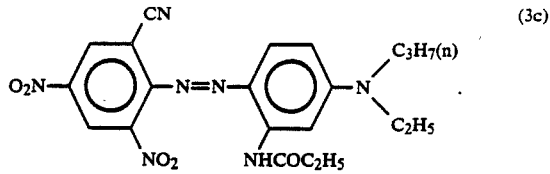

The resulting dyeing is a level deep blue dyeing with good fastness properties.

EXAMPLE 4

Example 1b is repeated using 4.6 parts of a 1:1 mixture of components (B) and (E) instead of 18 parts of components (A) and (B), component (E) being a 1:1 mixture of the compound of formula 4a

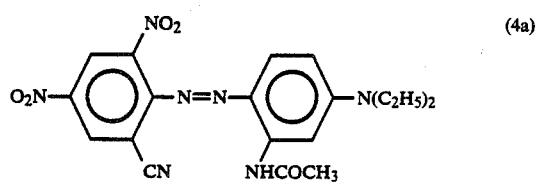

and the compound of formula 4b

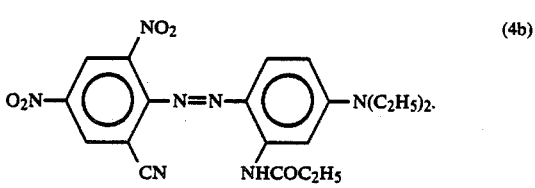

λmax of the mixture is 601 nm. The resultant dyeing is similar to that of Example 1.

EXAMPLES 5 to 10

In the following examples, compositions of components (A) and (B) where component (A) is a compound of the formula

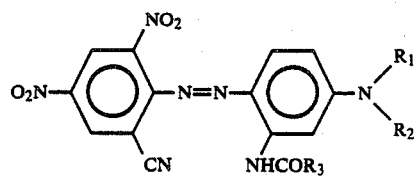

and component (B) is a mixture consisting of
(i) 25% of a compound of the formula

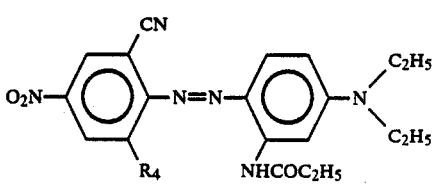

(ii) 25% of a compound of the formula

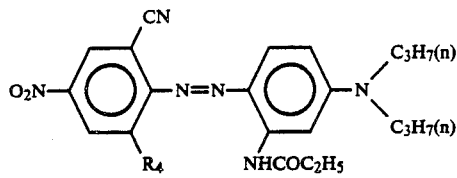

(iii) 50% of a compound of the formula

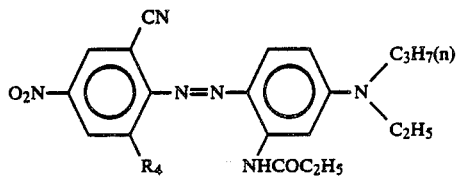

in which the symbols $R_1$ to $R_4$ are defined in Table 1 below, are made up. The λmax values are all measured in DMF and are an average λmax value.

TABLE 1

| Ex. No. | $R_1$ | $R_2$ | $R_3$ | $R_4$ | Ratio of A:B by weight | λmax (nm)/DMF |
|---|---|---|---|---|---|---|
| 5 | —$C_2H_5$ | —$C_2H_5$ | —$CH_3$ | Br | 55:45 | 602 |
| 6 | " | " | —$C_2H_5$ | " | 60:40 | 603 |
| 7 | " | " | " | " | 40:60 | 597 |
| 8 | n-$C_3H_7$ | n-$C_3H_7$ | —$CH_3$ | " | 53:47 | 602 |
| 9 | —$C_2H_5$ | —$C_2H_5$ | " | Cl | 50:50 | 600 |
| 10 | n-$C_3H_7$ | n-$C_3H_7$ | " | " | 50:50 | 601 |

Appropriate amounts of these compositions are used to dye a polyester fabric by a method analogous to that of Example 1b. All the resulting dyeings are of a blue nuance and the compositions have good build-up superior to that of the individual components.

EXAMPLE 11

Example 1b is repeated using in place of 18 parts of components (A) and (B) 3.8 parts of a mixture comprising 90 parts of the mixture components (A) and (B) from Example 1b and 10 parts of the compound of formula 11a

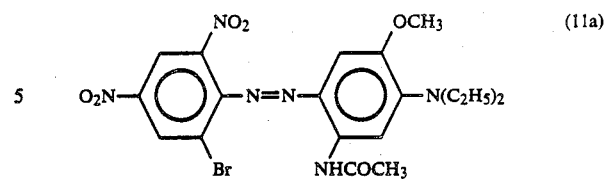

The resulting dyeing is a level deep blue dyeing with good fastness properties.

Instead of using the compound of formula 11a in Example 11 an appropriate amount of the compound of formula 11b.

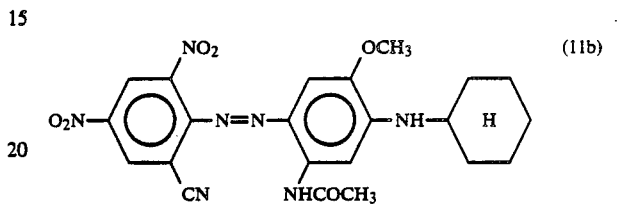

can be used.

EXAMPLES 12 TO 18

Compositions can be prepared of compounds of formula I

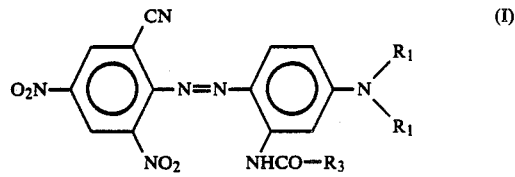

and compounds of Formula II

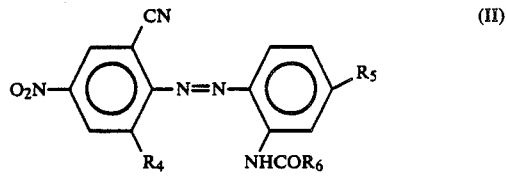

in which the symbols are defined in Table 2 below.

TABLE 2

| Example No. | $R_1$ | | $R_3$ | $R_4$ | $R_5$ | | $R_6$ | Ratio of I:II | λmax |
|---|---|---|---|---|---|---|---|---|---|
| 12 | —$C_2H_5$ | | —$CH_3$ | Br. | —$N(C_2H_5)_2$ —$N(C_3H_7)_2$ | ratio 1:1 | $C_2H_5$ | 50:50 | 599 |
| 13 | " | | " | " | —$N(C_2H_5)_2$ —$N(C_3H_7)_2$ | ratio 1:2 | $C_2H_5$ | " | 600 |
| 14 | " | | " | " | —$N(C_2H_5)_2$ —$N(C_3H_7)_2$ | ratio 2:1 | $C_2H_5$ | " | 598 |
| 15 | —$C_2H_5$ —$C_3H_7n$ | ratio 1:1 | " | " | —$N(C_2H_5)_2$ —$N(C_3H_7n)$ | ratio 1:1 | $C_2H_5$ | 55:45 | 602 |
| 16 | —$C_2H_5$ —$C_3H_7n$ | ratio 1:1 | " | | —$N(C_2H_5)_2$ —$N(C_3H_7n)$ | ratio 1:1 | $C_2H_5$ | 55:45 | 602 |
| 17 | —$C_2H_5$ —$C_3H_7n$ | ratio 1:1 | " | I | —$N(C_2H_5)_2$ —$N(C_3H_7n)$ | ratio 1:1 | $C_2H_5$ | 55:45 | 602 |
| 18 | —$C_2H_5$ | | —$C_2H_5$ | Br. | —$N(C_2H_5)_2$ | ratio 1:1 | " | 50:50 | 602 |

TABLE 2-continued

| Example No. | $R_1$ | $R_3$ | $R_4$ | $R_5$ | $R_6$ | Ratio of I:II | $\lambda$max |
|---|---|---|---|---|---|---|---|
| | —$C_3H_7n$ | | | —$N(C_3H_7)_2$ | | | |

What is claimed is:

1. A composition comprising
   (a) 30–70% by weight of one or more compounds of the formula

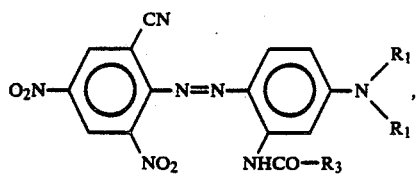

wherein each $R_1$ is independently $C_{2-4}$alkyl, and $R_3$ is methyl or ethyl, and
   (b) 30–70% by weight of one or more compounds of the formula

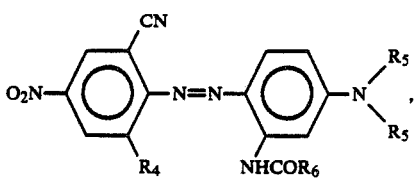

wherein $R_4$ is chloro, bromo or iodo, each $R_5$ is independently $C_{2-4}$alkyl, and $R_6$ is methyl or ethyl, each percentage being based upon the dry weight of Components (a) and (b).

2. A composition according to claim 1 wherein
   Component (a) consists of one, two or three compounds of the formula

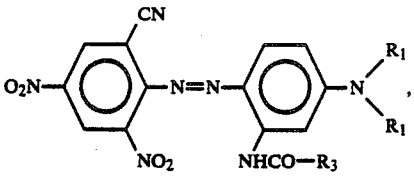

and
   Component (b) consists of one, two or three compounds of the formula

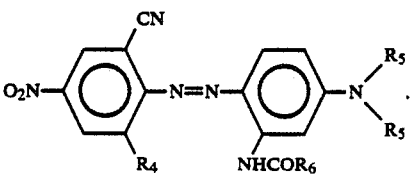

3. A composition according to claim 2 wherein Component (b) consists of two or three compounds of the formula

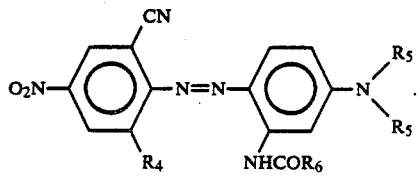

4. A composition according to claim 3 wherein each $R_1$ is independently ethyl or propyl, $R_3$ is methyl, $R_4$ is bromo, each $R_5$ is independently ethyl or propyl, and $R_6$ is ethyl.

5. A composition according to claim 1 wherein each $R_1$ is independently ethyl or propyl, $R_3$ is methyl, $R_4$ is bromo, each $R_5$ is independently ethyl or propyl, and $R_6$ is ethyl.

6. A composition according to claim 1 wherein Component (a) consists of a compound of the formula

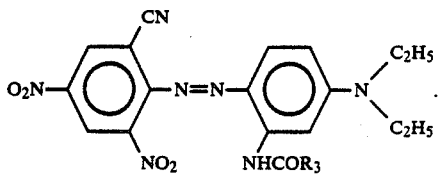

7. A composition according to claim 1 wherein Component (a) consists of
   (i) 40–60% by weight of a compound of the formula

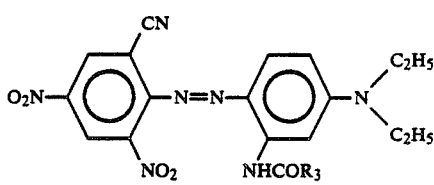

and
   (ii) 40–60% by weight of a compound of the formula

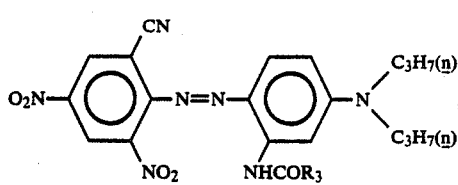

each percentage being based upon the dry weight of Component (a).

8. A composition according to claim 1 wherein Component (a) consists of
   (i) 20–30% by weight of a compound of the formula

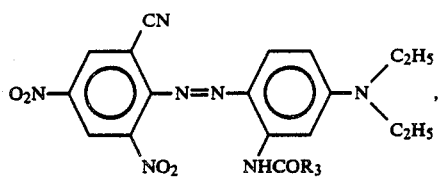

(ii) 20-30% by weight of a compound of the formula

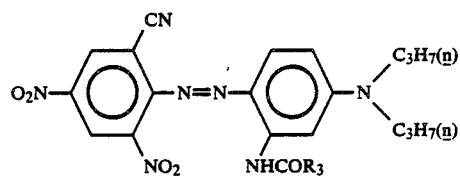

and
(iii) 40-60% by weight of a compound of the formula

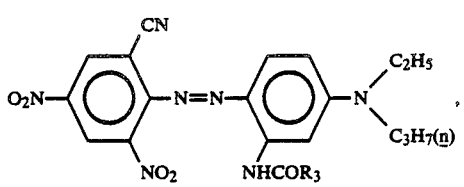

each percentage being based upon the dry weight of Component (a).

9. A composition according to claim 1 wherein Component (b) consists of
(i) 40-60% by weight of a compound of the formula

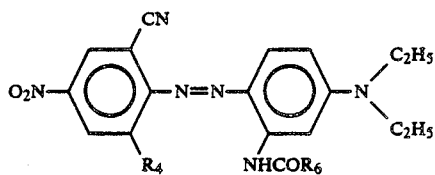

and
(ii) 40-60% by weight of a compound of the formula

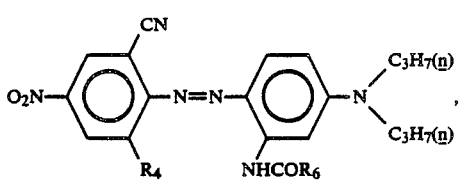

each percentage being based upon the dry weight of Component (b).

10. A composition according to claim 1 wherein Component (b) consists of
(i) 20-30% by weight of a compound of the formula

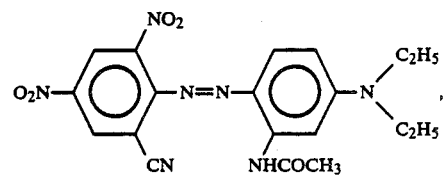

(ii) 20-30% by weight of a compound of the formula

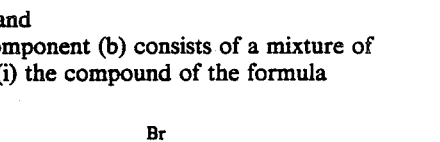

and
(iii) 40-60% by weight of a compound of the formula

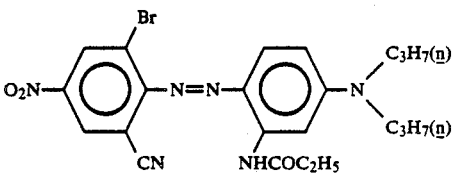

each percentage being based upon the dry weight of Component (b).

11. A composition according to claim 10 wherein Component (a) consists of the compound of the formula $$\text{structure}$$

and
Component (b) consists of a mixture of
(i) the compound of the formula $$\text{structure}$$

(ii) the compound of the formula $$\text{structure}$$

and
(iii) the compound of the formula

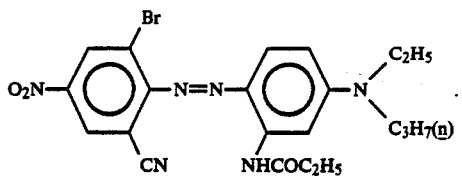

12. A composition according to claim 11 wherein the ratio of Component (a) to Component (b) is 1:1 by weight, based upon the dry weight of Components (a) and (b), and Component (b) consists of
(i) approximately 25% by weight of the compound of the formula

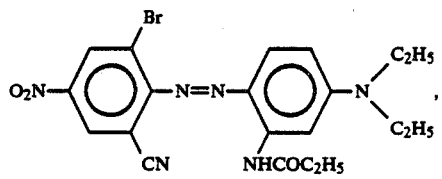

(ii) approximately 25% by weight of the compound of the formula

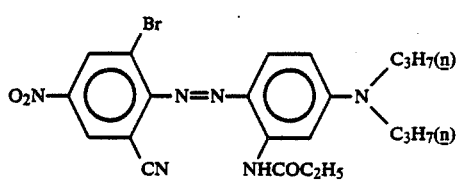

and
(iii) approximately 50% by weight of the compound of the formula

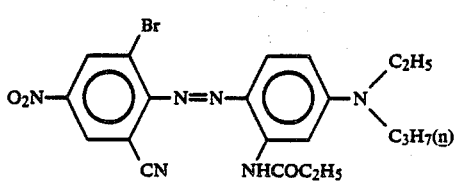

each of the percentages being based upon the dry weight of Component (b).

13. A composition according to claim 12 consisting of about 18% by weight of Components (a) and (b) and about 82% by weight of a ligninsulfonate dispersing agent, the composition being in powdered form.

14. A composition according to claim 1 comprising 1-10% by weight, based upon the dry weight of the total composition, of one or more compounds of the formula

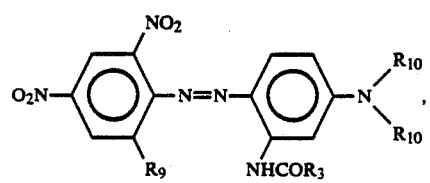

wherein $R_3$ is methyl or ethyl, $R_7$ is $C_{1-4}$alkoxy, $R_9$ is chloro, bromo, iodo or cyano, and each $R_{10}$ is independently hydrogen, $C_{1-6}$alkyl or cyclohexyl, with the proviso that not more than one $R_{10}$ is hydrogen, and not more than one $R_{10}$ is cyclohexyl.

15. A substrate comprising a synthetic or semi-synthetic hydrophobic organic material to which a composition according to claim 1 was applied.

16. A substrate according to claim 15 wherein the synthetic or semi-synthetic hydrophobic organic material is polyester.

17. A process for rapid dyeing a substrate comprising a synthetic or semi-synthetic hydrophobic organic material comprising (1) raising the temperature of a dyebath containing a substrate comprising a synthetic or semi-synthetic hydrophobic organic material and a composition according to claim 1 from 50°-60° C. to 120°-130° C., inclusive, over a period of up to 30 minutes and (2) maintaining said dyebath containing said substrate at a temperature of 120°-130° C., inclusive, for a period of up to 30 minutes.

18. A process according to claim 17 wherein each of Steps (1) and (2) is carried out over a period of 20-30 minutes.

19. A process according to claim 18 wherein the synthetic or semi-synthetic hydrophobic organic material is polyester.

20. A process according to claim 19 wherein Component (a) is the compound of the formula

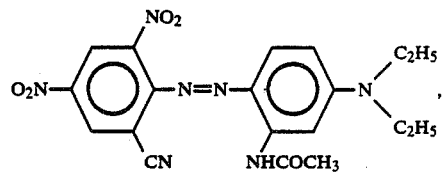

and
Component (b) consists of
(i) approximately 25% by weight of the compound of the formula

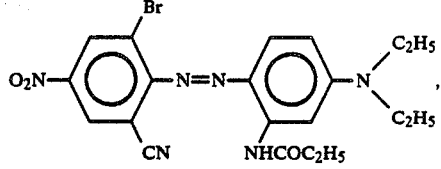

(ii) approximately 25% by weight of the compound of the formula

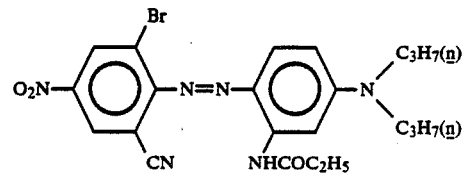

and
(iii) approximately 50% by weight of the compound of the formula

15
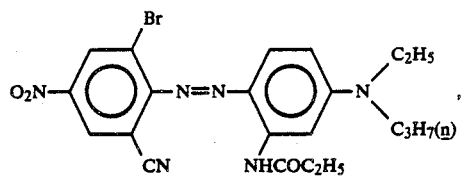
each of the percentages being based upon the dry weight of Component (b), and the ratio of Component (a) to Component (b) is 1:1 by weight, based upon the dry weight of Components (a) and (b).
* * * * *
16
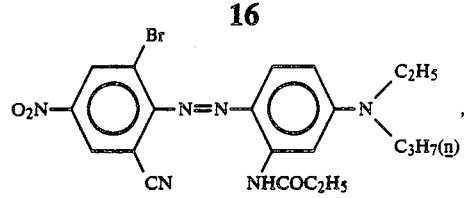
each of the percentages being based upon the dry weight of Component (b), and the ratio of Component (a) to Component (b) is 1:1 by weight, based upon the dry weight of Components (a) and (b).
* * * * *